United States Patent
Li et al.

(10) Patent No.: US 9,350,899 B2
(45) Date of Patent: May 24, 2016

(54) METHODS AND DEVICE FOR EFFICIENT RESAMPLING AND RESIZING OF DIGITAL IMAGES

(75) Inventors: Min Li, San Diego, CA (US);
Chia-Yuan Teng, San Diego, CA (US);
Gregory Allan VanSickle, Stouffville (CA)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 13/616,830

(22) Filed: Sep. 14, 2012

(65) Prior Publication Data

US 2014/0078393 A1   Mar. 20, 2014

(51) Int. Cl.
| | |
|---|---|
| H04N 7/01 | (2006.01) |
| H04N 11/20 | (2006.01) |
| H04N 1/40 | (2006.01) |
| H04N 9/64 | (2006.01) |
| H04N 19/59 | (2014.01) |

(52) U.S. Cl.
CPC .......... *H04N 1/40068* (2013.01); *H04N 7/0102* (2013.01); *H04N 9/64* (2013.01); *H04N 19/59* (2014.11); *H04N 11/20* (2013.01)

(58) Field of Classification Search
CPC ................................ H04N 9/64; H04N 11/20
USPC .......................................... 348/708, 581, 453
See application file for complete search history.

(56) References Cited

U.S. PATENT DOCUMENTS

| | | | |
|---|---|---|---|
| 5,684,544 A | 11/1997 | Astle | |
| 5,712,687 A | 1/1998 | Naveen et al. | |
| 5,777,679 A | 7/1998 | Cheney et al. | |
| 7,479,989 B2 | 1/2009 | Hsu | |
| 7,570,270 B2 | 8/2009 | Payson et al. | |
| 7,956,930 B2 * | 6/2011 | Sullivan | G06T 3/4007 348/443 |
| 2004/0008790 A1 * | 1/2004 | Rodriguez | H04N 5/76 375/240.26 |
| 2005/0030422 A1 * | 2/2005 | Leone | H04N 9/64 348/441 |
| 2006/0210185 A1 | 9/2006 | Sun | |
| 2007/0160153 A1 | 7/2007 | Sullivan | |
| 2011/0080519 A1 | 4/2011 | Chowdhry et al. | |
| 2012/0212673 A1 * | 8/2012 | Pande | G06T 3/4007 348/581 |
| 2013/0336591 A1 * | 12/2013 | Jeon | G06T 9/004 382/238 |

OTHER PUBLICATIONS

International Search Report and Written Opinion—PCT/US2013/053976—ISA/EPO—Oct. 30, 2013.

* cited by examiner

*Primary Examiner* — Jefferey Harold
*Assistant Examiner* — Omer Khalid
(74) *Attorney, Agent, or Firm* — Knobbe Martens Olson & Bear LLP

(57) ABSTRACT

Described are a system and method to determine the initial luma and chroma phase such that the resulting image after chroma upsampling and scaling has zero phase difference between the luma and chroma components. Particularly, the described method may include receiving a subsampled input image having luma and chroma values. The method may then perform a phase computation of the input image to determine scaling parameters such that phase differences between all color components of an output image are zero. The method may then include performing a combined upscaling and upsampling process on the input image using the scaling parameters to generate an upscaled image with no phase difference from the subsampled image.

20 Claims, 6 Drawing Sheets

METHODS AND DEVICE FOR EFFICIENT RESAMPLING AND RESIZING OF DIGITAL IMAGES

BACKGROUND OF THE INVENTION

1. Field of the Invention

One aspect of the invention relates to digital image processing using techniques to efficiently process digital images.

2. Description of the Related Art

Video systems convey one component representative of luminance, luma, and two other components representative of color, chroma. In many systems, luma and chroma are represented as Y'CbCr with Y representing luma and Cb and Cr representing chroma.

In order to reduce bandwidth requirements for sending video across lower bitrate data streams images are typically subsampled such that their chroma components are reduced. Because users are less sensitive to the position and motion of color in comparison to luminance, the chroma detail of a video can be subsampled without incurring a perceptible loss of image quality. For example, a full bandwidth signal that is four pixels across and four pixels high (4:4:4 Y'CbCr) image may be subsampled to a 4:2:2 Y'CbCr scheme wherein the chroma components are only sampled at half the data rate of the luma component vertically. The full bandwidth signal can be subsampled to a 4:2:0 Y'CbCr scheme wherein the chroma components are only sampled at half the data rate of the luma component both horizontally and vertically.

While this scheme allows transmission of video images at a lower overall bandwidth, the encoder which eventually displays the subsampled images needs to upsample and scale the subsampled images in order to display a final video in high resolution to a user. In order to upsample and scale subsampled image data, typical display systems include two separate hardware modules for 1) upsampling the chroma samples and 2) changing the resolution of the input source image/frame to match the display resolution.

SUMMARY OF THE INVENTION

Some of the embodiments may comprise a computer-implemented method for processing images. The method may comprise receiving a subsampled input image having luma and chroma values. The method may further comprise performing a phase computation of the input image to determine scaling parameters such that phase differences between all color components of an output image are zero. The method may further comprise performing a combined upscaling and upsampling process on the input image using the scaling parameters to generate an upscaled image with no phase difference from the subsampled image.

The method may further comprise calculating a scaling ratio based on the luma and chroma width and height of the input image. The method may further comprise a subsampled input image that has a different number of luma and chroma samples. The method may further comprise representing the phase difference between luma and chroma samples after the phase computation in terms of an initial phase of luma plane scaling and an initial phase of chroma plane scaling such that the phase difference is zero, and calculating the x and y dimension scalings of chroma based on the scaling ratio and x and y dimension initial phase differences.

Other embodiments may comprise a non-transitory, computer readable media, comprising instructions that when executed by a processor cause the processor to perform a method of processing images, the method comprising the steps of receiving a subsampled input image having luma and chroma values, performing a phase computation of the input image to determine scaling parameters such that phase differences between all color components of an output image are zero, and performing a combined upscaling and upsampling process on the input image using the scaling parameters to generate an upscaled image with no phase difference from the subsampled image.

Other embodiments may comprise a computer-readable apparatus for processing images, comprising means for performing a phase computation of an input image to determine scaling parameters such that phase differences between all color components of an output image are zero, and means for performing a combined upscaling and upsampling process on the input image using the scaling parameters to generate an upscaled image with no phase difference from the subsampled image.

Other embodiments may comprise a processor configured to perform a method for processing images, the method comprising receiving a subsampled input image having a different number of luma and chroma samples, performing a phase computation of the input image to determine scaling parameters such that phase differences between all color components of an output image are zero, and performing a combined upscaling and upsampling process on the input image using the scaling parameters to generate an upscaled image with no phase difference from the subsampled image.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
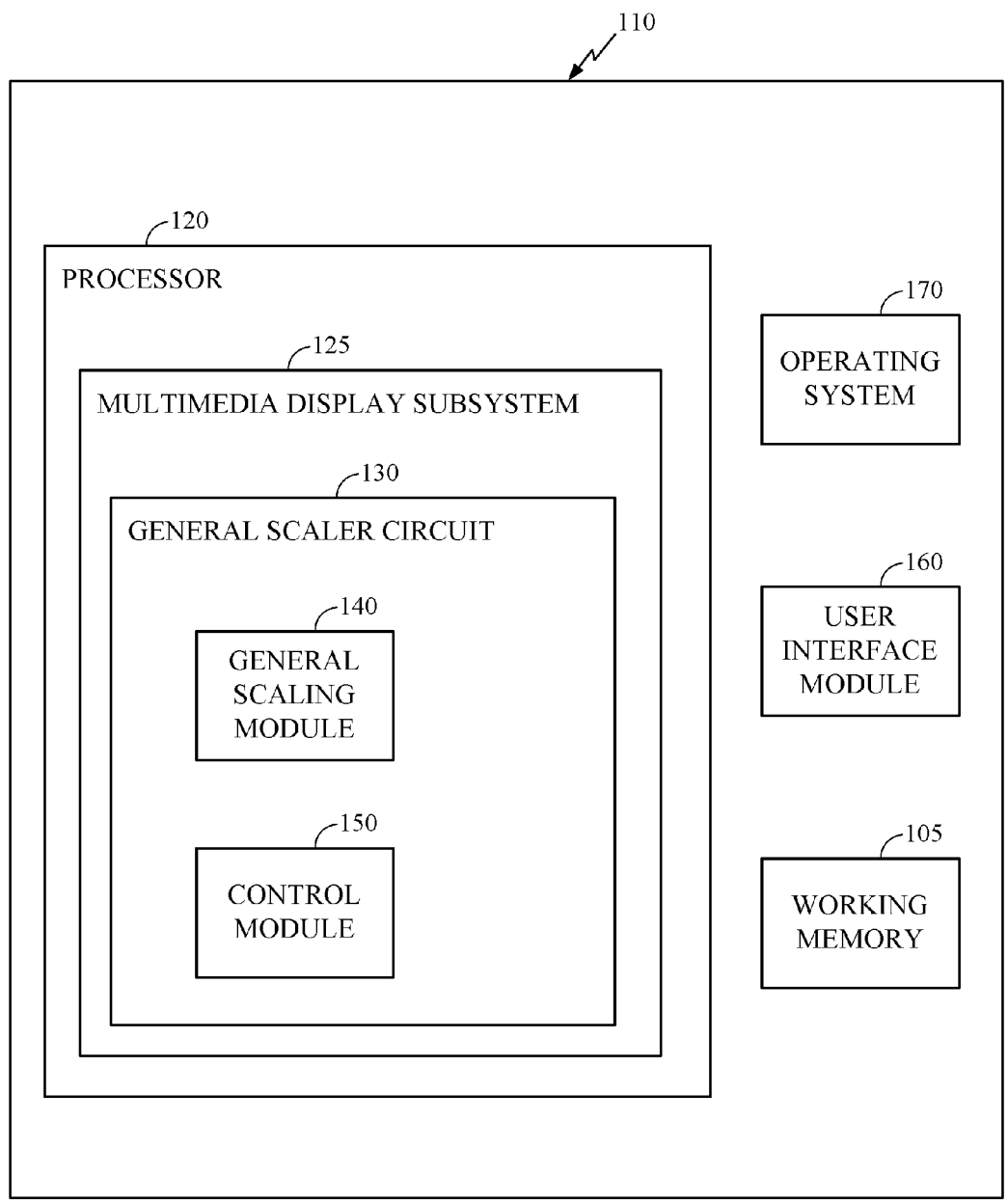
FIG. 1 is a block diagram depicting a device implementing some operative embodiments of the invention.

Color images are generally represented by three independent vectors in one of various formats, e.g. Red, Green, Blue (RGB) or Y'CbCr, where Y represents the luma pixels and Cb and Cr represent the chroma pixels. Chroma pixels are typically subsampled by representing multiple chroma pixels with a single chroma pixel (for example, an arbitrary, representative or average chroma pixel) so that the multiple chroma pixels can be encoded and transmitted at a lower bitrate. Common spatial subsampling methods include 4:2:2 Y'CbCr subsampling or 4:2:0 Y'CbCr subsampling. In 4:2:2 Y'CbCr subsampling, both chroma components are subsampled at half the rate of the luma component horizontally while vertically subsampled at the full rate. In 4:2:0 Y'CbCr subsampling, both chroma components are subsampled at half the rate of the luma component both horizontally and vertically.

Signal processing is often used to compress or encode image signals into an encoded bitstream and to decompress or decode such encoded bitstream to reconstruct the original image signals. The portion of an encoded bitstream representing a compressed image may be stored in a mass storage device in its compressed format in order to conserve storage space. When the compressed image is later retrieved, it may be decompressed and, for example, displayed on a monitor or other display device. A higher amount of compression of the blocks constituting an image tends to lower the number of bits needed to represent the image but also tends to diminish the quality of the image reconstructed during the decoding process. Implementations disclosed herein provide systems, methods, and apparatus for processing a digital image using a general hardware module that combines chroma upsampling and scaling functions in one hardware module.

Aspects of the invention relate to an integrated hardware device, such as a microprocessor or graphics processor that successfully combines chroma upsampling and scaling hardware modules. This integrated device may be part of a graphics processing unit (GPU) such as the Adreno GPU (Qualcomm, Inc., San Diego, Calif.), which may be integrated within a Snapdragon™ (Qualcomm, Inc, San Diego, Calif.) processor or other mobile processor. The integrated device may be part of a multimedia display subsystem (MDSS) such as Aragorn 2.0 (Qualcomm, Inc., San Diego, Calif.) and Gandalf 1.0 (Qualcomm, Inc., San Diego, Calif.), which may be integrated within a Snapdragon™ (Qualcomm, Inc, San Diego, Calif.) processor or other mobile processor. The integration of the chroma upsampling and scaling modules allows the system to consistently achieve in-phased results, along with reducing hardware area cost and module verification efforts.

Accordingly, one embodiment includes a system with an integrated hardware device having a general scaler module capable of performing both chroma upsampling and image scaling functions. Within the integrated hardware device, a chroma upsampling module processes a chroma subsampled input and returns a fully sampled format. For example, it may input a 4:4:2 Y'CbCr signal and output a 4:4:4 Y'CbCr signal. The scaling function, working with the upsampling function, then takes the full chroma 4:4:4 Y'CbCr signal and upscales the resolution of the input source image to a desired resolution to match the display hardware. A software support module controlling the integrated hardware device works to ensure that the chroma components are in phase with the luma components after the chroma upsampling and scaling processes have been completed.

The chroma upsampling process is relatively straightforward, but when combined with the scaling process the output chroma components are ideally matched and in phase with the luma components so that there is no phase distortion of the final images displayed to the user. Therefore, a general scaling hardware module should have the correct input such that the resulting image is in phase with no phase distortion.

Figure 4:
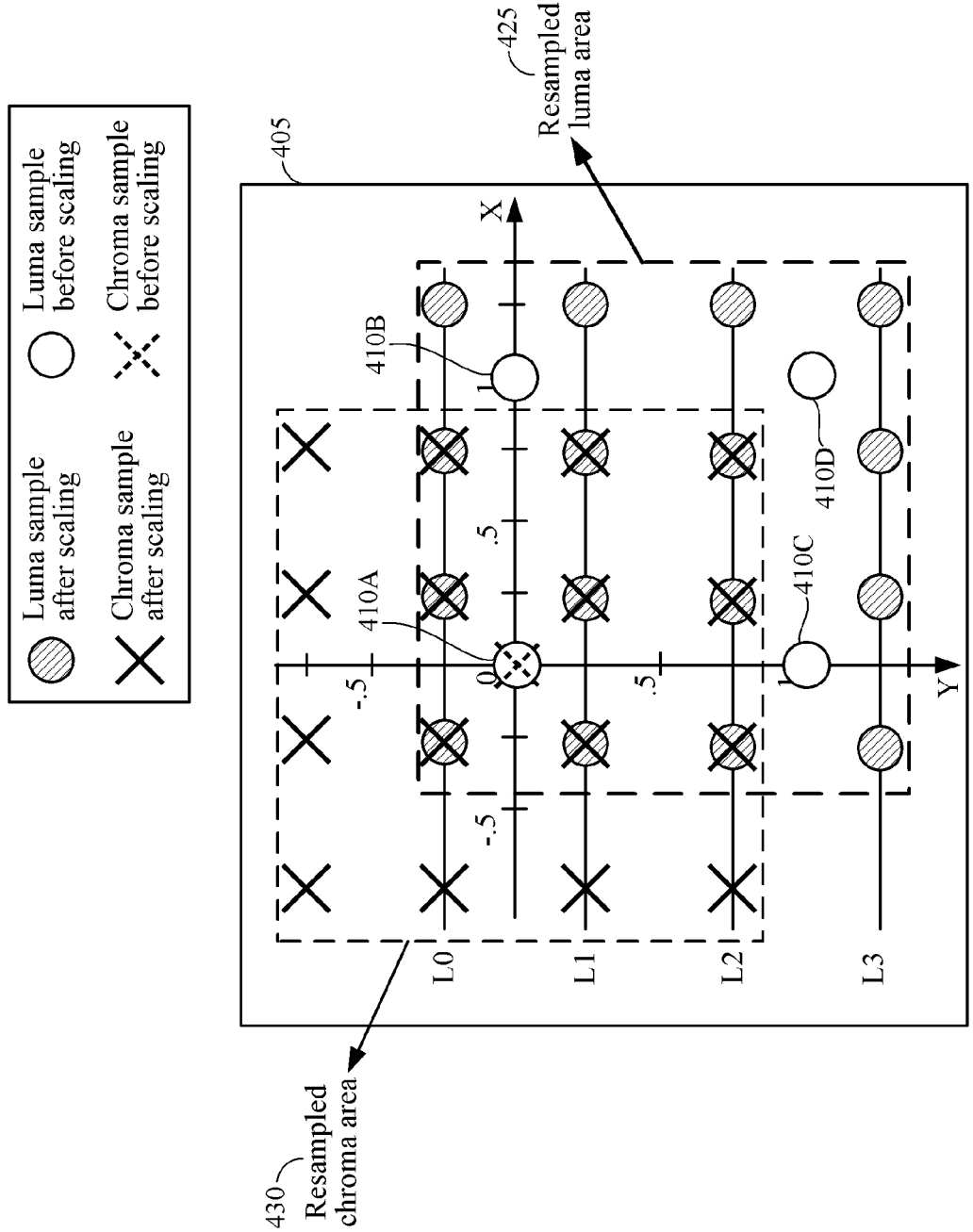
FIG. 4 illustrates an out-of-phase example of upscaling an image wherein the phase shift between luma and chroma samples of a pixel is non-zero.

In most cases, a scaling process is actually a re-sampling process of the same analog image. The original image and all up/down scaled images should be various digital representations of this analog image. If re-sampled without correcting the initial input, the resultant luma and chroma area will be out of phase or shifted, as seen in FIG. 4. If this shift is ignored, and if the first interpolated luma sample and chroma sample are thought of as the matching luma and chroma samples of a single pixel, this pixel may have distorted color compared to the original analog image because the pairs are mismatched.

Some embodiments may also incorporate software support to insure that the resulting processed images are as close as possible to the original unencoded images, prior to sampling. Some embodiments may perform an initial phase computation algorithm prior to processing the image.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The techniques of this disclosure may be applicable to a variety of image processing systems. Additionally, the techniques of this disclosure may be applicable to input data subsampled at different rates, such as 4:2:2 and 4:2:0 Y'CbCr.

In the context of the present invention, "in-phase" means that the matched luma and chroma samples of the output data have to be the true and correct combinations. If there are mismatches between the luma and chroma samples of a single pixel, this mismatch results in out-of-phase or phase distortion of the image. Phase distortion may cause a color shifting problem, in which, compared to the original image, the color shifted version has a visibly distorted color scheme.

FIG. 1 depicts a high-level block diagram of an integrated hardware device 110. The device 110 may be any type of electronic device that processes images, such as a cell phone, digital camera, a digital television, a netbook, a tablet, a laptop or desktop computer, or the like. As shown, the device 110 comprises a processor 120 that is configured to run the operations of the device 110. The processor 120 further comprises a multimedia display sub system (MDSS) 125 that has a general scaler circuit 130. The general scaler circuit 130 may further comprise various modules for performing an integrated chroma upsampling and scaling process, such as general scaling module 140 and a control module 150. These hardware modules include hardware and embedded instructions within the MDSS 125 that perform various image processing and device management tasks as discussed in more detail below.

The processor 120 may also be connected to a working memory component 105, an operating system 170 and a user interface module 160. Of course, it should be realized that other configurations in which working memory is not integrated within the processor 120 are also contemplated.

As mentioned above, the general scaler circuit 130 includes both hardware circuitry and embedded code that allows the general scaler circuit 130 to perform both chroma upsampling and resolution scaling on an input image that is to be output to an electronic display connected to the device 110. By using the general scaler circuit 130, the output image can be set to have the same number of luma and chroma samples after undergoing processing. Additionally, the output image luma and chroma pixels can be set to be in-phase after the input image is processed by the general scaler circuit 130.

The control module 150 may include instructions that ensure that the resultant output image is in phase and has matched luma and chroma pairs as compared to the input image. Therefore, the control module 150 represents one means for performing a phase computation of the input image to determine scaling parameters such that phase differences between all color components of an output image are zero. Furthermore, the general scaler circuit 130 represents one means for performing a combined upscaling and upsampling process on the input image using the scaling parameters to generate an upscaled image with no phase difference from the subsampled image.

Operating system module 170 configures the processor to manage the memory and processing resources of device 110. For example, operating system module 170 may include device drivers to manage hardware resources such as an electronic display. Therefore, in some embodiments, instructions contained in the image processing modules discussed above may not interact with this hardware resource directly, but instead interact through standard subroutines or APIs located in operating system component 170. Instructions within operating system 170 may then interact directly with an electronic display. User interface module 165 includes instructions that configure the processor to display information on an electronic display.

Additionally, although FIG. 1 illustrates a separate memory 105 comprising a working memory, one with skill in the art would recognize several embodiments utilizing different memory architectures. For example, a design may utilize ROM or static RAM memory for the storage of processor instructions implementing the modules contained in the general scaler circuit 130. Alternatively, processor instructions may be read at system startup from a disk storage device that is integrated into device 110 or connected via an external device port. The processor instructions may then be loaded into RAM to facilitate execution by the processor. For example, working memory 105 may be a RAM memory, with instructions loaded into working memory 105 before execution by the processor 120.

Figure 2:
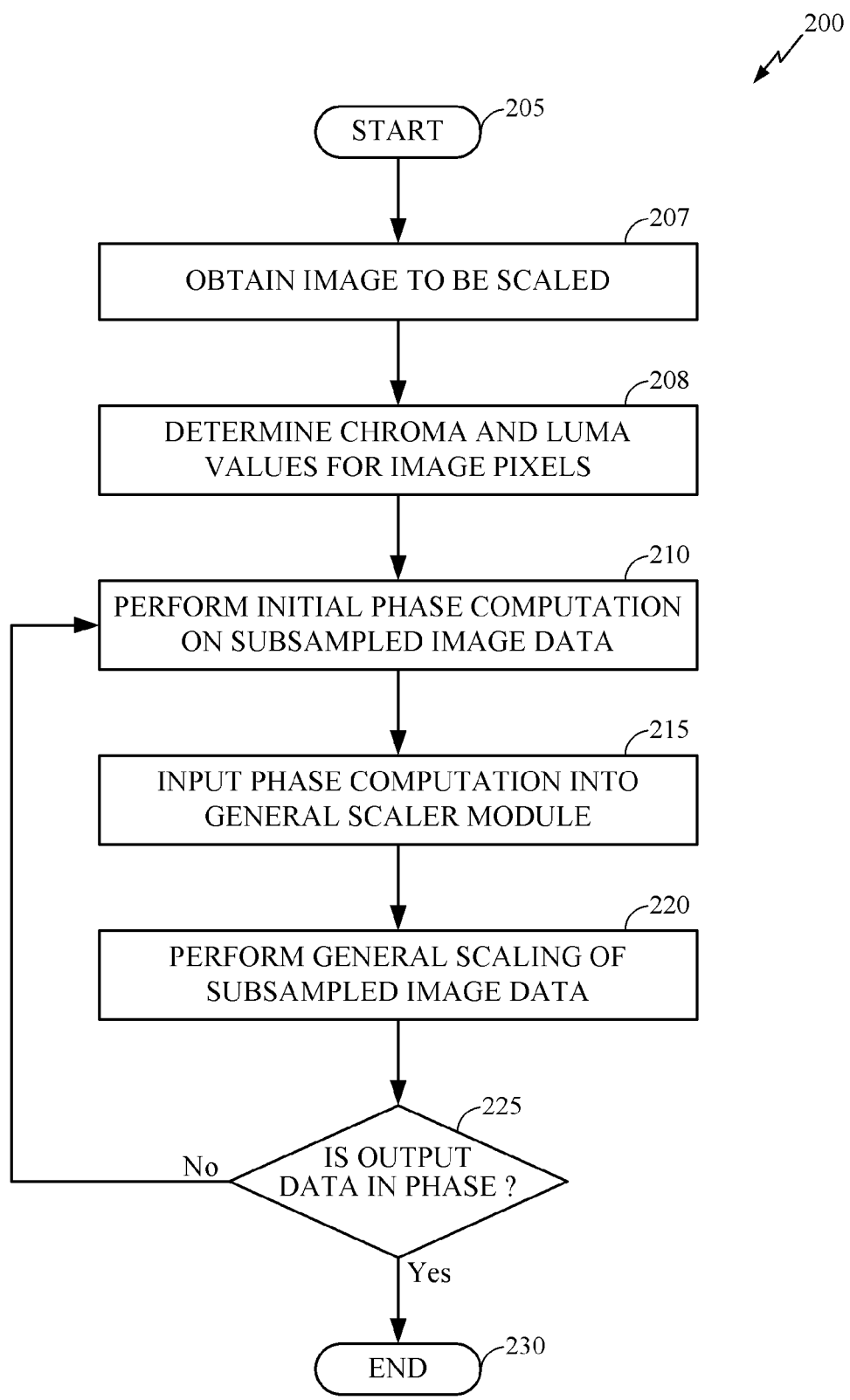
FIG. 2 is a flow chart depicting one embodiment of a chroma upsampling and scaling process.

FIG. 2 is a flow chart depicting a high-level overview of a combined chroma upsampling and scaling process 200 performed in an integrated hardware device such as the general scaler circuit 130. The process 200 begins at start block 205 and then transitions to block 207 wherein a subsampled image to be chroma upsampled and scaled is obtained. The subsampled image may be obtained from a register within the MDSS 125, or external to the MDSS 125 such as from a video decoder, camcorder, or external HDMI ports. Once the subsampled image has been obtained at the block 207 the process 200 moves to a block 208 wherein the chroma and luma values for the pixels within the subsampled image are determined. The process 200 then moves to a block 210 where instructions direct the MDSS 125 to perform an initial phase computation on the subsampled image data.

To avoid the phase shifting problem in the interpolated results (shown in FIG. 4) and avoid color distortion in the fully sampled image, an initial phase computation is performed in the integrated hardware device.

The chroma site information of the subsampled image data input to the general scaler module 140 may contain the phase difference between the luma and chroma samples of the original image and the subsampled image. Let $\Delta P_0$ represent this initial phase difference. Of the nine legal chroma sites that are supported, there are three legal sites in one dimension:

$$\Delta P_0 = \begin{cases} 0 \\ 0.5 \\ 1, \end{cases}$$

where "1" represents the unit distance between two neighboring pixel samples in luma plane.

Initial phases used by the general scaler module 140 should offset these phase differences such that the output yuv444 data are in-phase (that is, the phase difference among all color components is zero). If we let $\Delta P_1$ represent the phase difference between luma and chroma samples after scaling:

$$\Delta P_1 = 0.$$

With $\Delta P_0$ and $\Delta P_1$ defined, their geometry relation can be described by the equation below:

$$\Delta P_1 = (P_{chroma}L + \Delta P_0 - P_{luma})\frac{1}{s},$$

where s represents the scaling ratio that is to be calculated in the general scaler module 140. The value of s is ½ for 2× upscaling and ¼ for 4× upscaling. $P_{chroma}$ and $P_{luma}$ represent the initial phases of chroma plane scaling and luma plane scaling, respectively. L is the ratio of luma dimension to chroma dimension, as further discussed below. For example, L is two for input data in the format yuv420 where in each dimension the luma plane has twice the number of samples as the chroma plane.

Figure 6:
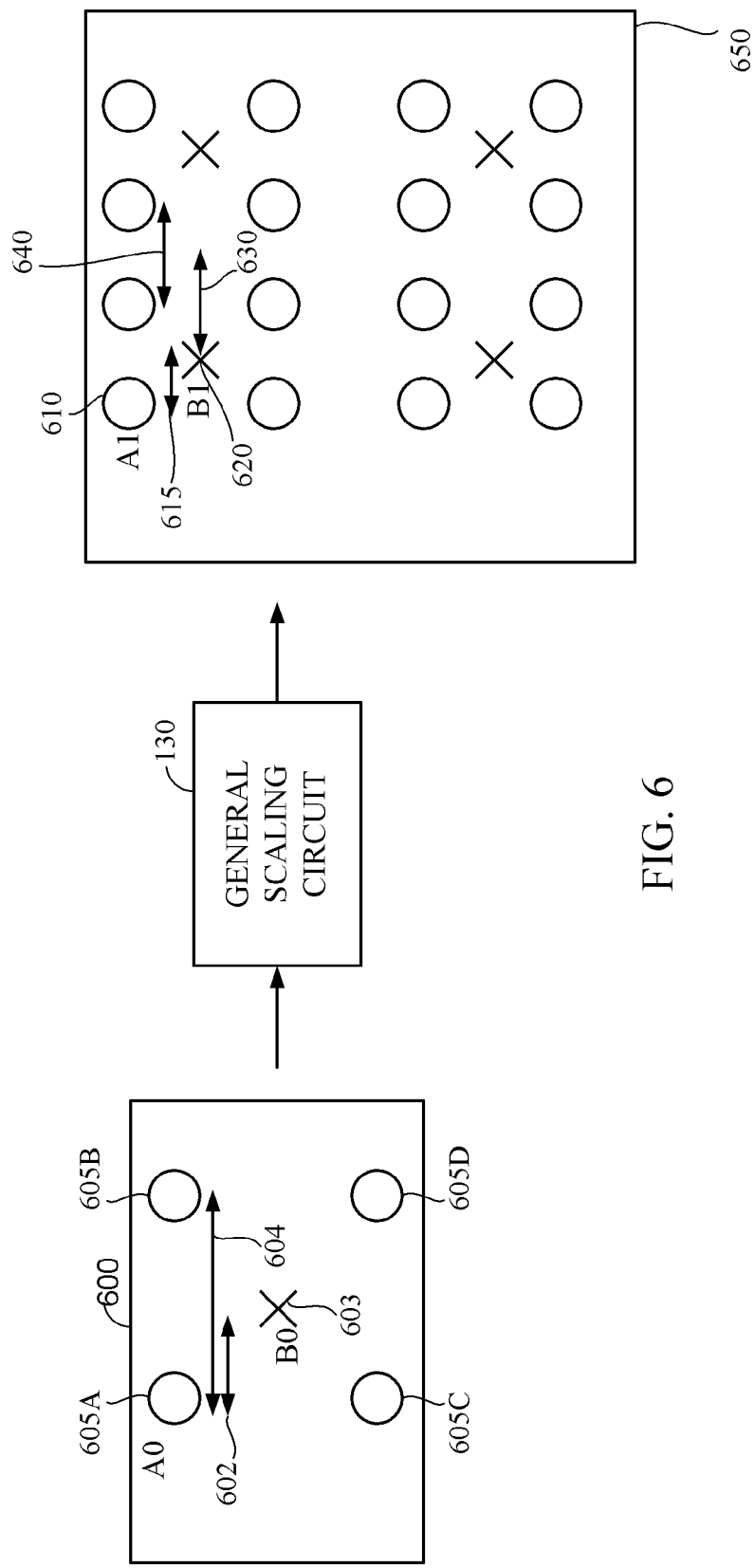
FIG. 6 illustrates two sampling versions of an analog image, a low resolution sampling and a related high resolution sampling.

For example, a single analog image may be resampled at a low and at a high resolution, as shown in FIG. 6. The geometry relation described in the above equation is true in both horizontal and vertical dimensions. The discussion below will use the horizontal dimension as an example.

The box 600 in FIG. 6 shows a low resolution sampled version of an analog image. In both boxes 600 and 650, the circles represent luma samples while the crossings represent chroma samples.

Circle 605A represents the first luma sample, A0, while crossing 603 represents the first chroma sample, B0. According to the definition of phase difference, distance 602 represents the horizontal distance between A0 and B0, defined as $\Delta P_0$. When measuring $\Delta P_0$, the unit one is defined as the horizontal distance between two neighboring luma samples, shown as 604 in FIG. 6. Therefore:

$$\Delta P_0 = B0 - A0 \text{ (unit one defined by distance 604)}$$

For the high resolution sampling indicated by box 650, circle 610 represents the first luma sample, A1, while crossing 620 represents the first chroma sample, B1. According to the definition of phase difference, distance 615 represents the horizontal distance between A1 and B1, defined as $\Delta P_1$. When measuring $\Delta P_1$, the unit one is defined as the horizontal distance between two neighboring luma samples, shown as 640 in FIG. 6. Similarly, $\Delta P_1 = B1-A1$ (unit one defined by distance 640)

According to the above definitions of initial phases, the initial phase of luma component $P_{luma}$ relates A1 and A0 as $P_{luma} = A1 - A0$ (unit one defined by distance 604)

And for chroma components, B1 and B0 are related:

$P_{chroma} = B1 - B0$ (Unit one defined by L multiplied by the distance 604, which is the unit one of the input chroma plane).

Conversion of some of the variables to the same coordinate system for geometry calculation proceeds as follows. Distance 630, or $P_{chroma}$, can be converted to the input luma plane by multiplying by a factor of L:

$P_{chroma} * L = B1 - B0$ (Unit one defined by distance 604).

And by subtracting the equation for $P_{luma}$ from the equation for $P_{chroma} * L$:

$P_{chroma} * L - P_{luma} = B1 - A1 - (B0 - A0)$

The above equation for $\Delta P_0$ shows a relation in the same coordinate system. Combining the above equation with the equation for $\Delta P_0$:

$P_{chroma} * L - P_{luma} = B1 - A1 - \Delta P_0$

Rearranging:

$B1 - A1 = P_{chroma} * L - P_{luma} + \Delta P_0$ (Unit one defined by distance 604)

From the above equations, the phase difference after scaling, $\Delta P_1$, is defined on the luma plane after scaling. The two coordinate systems, luma plane before scaling and luma plane after scaling, are related to each other by the scaling factor 1/s.

By multiplying by the factor 1/s, the distance $(P_{chroma} * L - P_{luma} + \Delta P_0)$ will be measured in the luma plane after scaling coordinate system. Therefore:

$B1 - A1 = (P_{chroma} * L - P_{luma} + \Delta P_0) * 1/s$ (Unit one defined by distance 640)

From the above equations (B1−A1) may be replaced by $\Delta P_1$ resulting in:

$$\Delta P_1 = (P_{chroma} L + \Delta P_0 - P_{luma}) \frac{1}{s}.$$

The general scaler module 140 desirably outputs in-phase color planes, resulting in:

$P_{chroma} L + \Delta P_0 - P_{luma} = 0.$

If $P_{luma}$ is represented by the following equation:

$$P_{luma} = \frac{s-1}{2},$$

Substitution results in the following equation for $P_{chroma}$ $$P_{chroma} = (P_{luma} - \Delta P_0)/L$$

$$= \frac{\frac{s-1}{2} - \Delta P_0}{L}$$

X and Y dimension scalings can be expressed by the following equations:

$$P_{chroma\_x} = \frac{\frac{s_x - 1}{2} - \Delta P_{0x}}{L}$$

and $$P_{chroma\_y} = \frac{\frac{s_y - 1}{2} - \Delta P_{0y}}{L}$$

Where L is defined as the ratio of luma dimension to chroma dimension:

$$L = \frac{Luma_{Width}}{Chroma_{Width}} \text{ for horizontal dimension and}$$

$$L = \frac{Luma_{Height}}{Chroma_{Height}} \text{ for vertical dimension.}$$

and $Luma_{Width}$, $Luma_{Height}$, $Chroma_{Width}$, and $Chroma_{Height}$, are the dimensions of the source data.

After performing the initial phase computation, the process 200 then transitions to block 215 wherein instructions direct the MDSS 125 to input the determined phase computation into the general scaler module 140. From block 215, process 200 transitions to block 220 wherein instructions direct the MDSS 125 to perform a combined chroma upsampling and scaling function on the subsampled image data, using the determined initial phase computation. One example of performing this combined chroma upsampling and scaling function can be found in FIG. 3 which illustrates one example of upscaling subsampled image data in which the scaling ratio is ¼.

Process 200 then transitions to decision block 225 in which a control module 150 determines whether the fully sampled data is in phase, meaning that the chroma and luma values of the original image and the chroma upsampled and scaled image fully match one another. If the fully sampled image data is in phase, process 200 moves to block 230 and ends. If the fully sampled image data is determined to be out of phase, process 200 returns to block 210 and repeats the process as described above.

Figure 3:
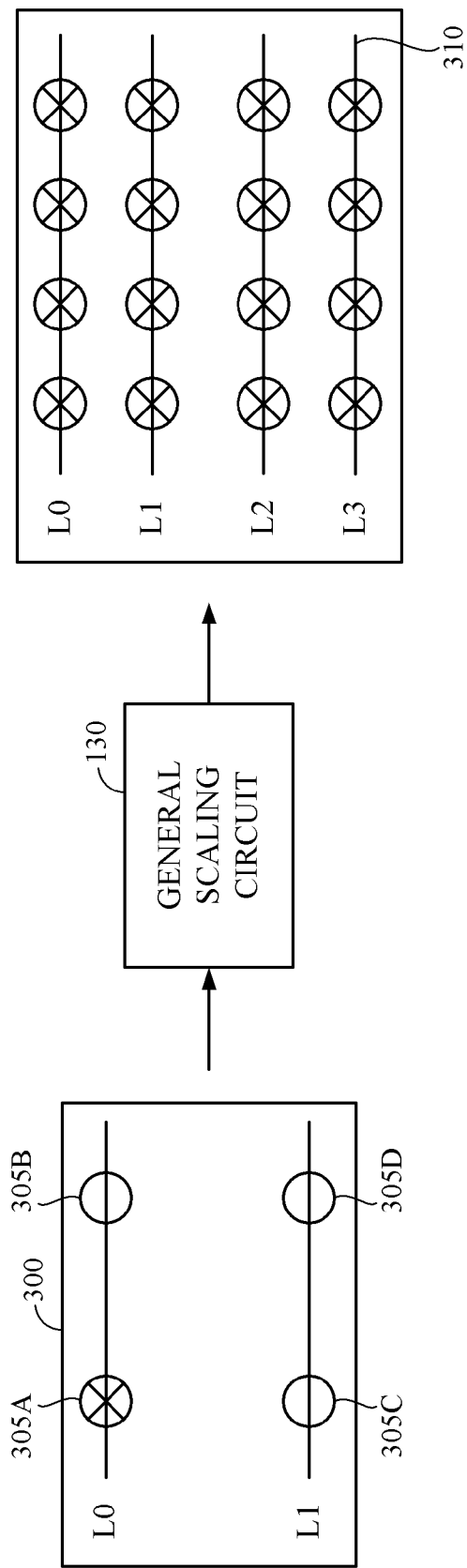
FIG. 3 illustrates the chroma upsampling and scaling functions performed on subsampled input data utilized in one embodiment of the invention.

FIG. 3 shows one example of chroma upsampling an image by a factor of 2 and retaining the correct phase of the chroma samples for each pixel. As shown, subsampled image data 300 is chroma upsampled and scaled to yield image data 310. Each of the four pixels 305A-D have a luma sample value associated with them (dark circle). One pixel, 305A, in the subsampled image data 300 has a chroma value associated with it, as shown by the "X" marked in pixel 305A. As shown, the image data 300 is passed through the general scaling circuit 130 which then upsamples and scales the image data 300 to be the image data 310 wherein there are luma and chroma values for each of the sixteen pixels. As shown, all of the pixels within the image data 310 have matched luma and chroma pairs after processing and thus, the pixel values stayed in phase after being processed through the general scaling circuit 130.

FIG. 4 illustrates one example of upsampled and scaled and image data 405 wherein the chroma values are out of phase with the luma values. As shown, original pixels 410A-D were processed to be upsampled and scaled. Pixel 410A had both luma and chroma values, while pixels 410B-D only had associated luma values. After processing, an upsampled luma area 425 comprises luma values for 16 pixels that were calculated on the basis of the luma values from the original pixels 410A-D. However, the luma area 425 is offset from an upsampled chroma area 430 which, while also having chroma values for 16 pixels, has a phase shift in comparison to the positions of the pixels in the luma area 425. Accordingly, this phase shift would lead to chroma values for one pixel being improperly associated with luma values of a different pixel.

Figure 5:
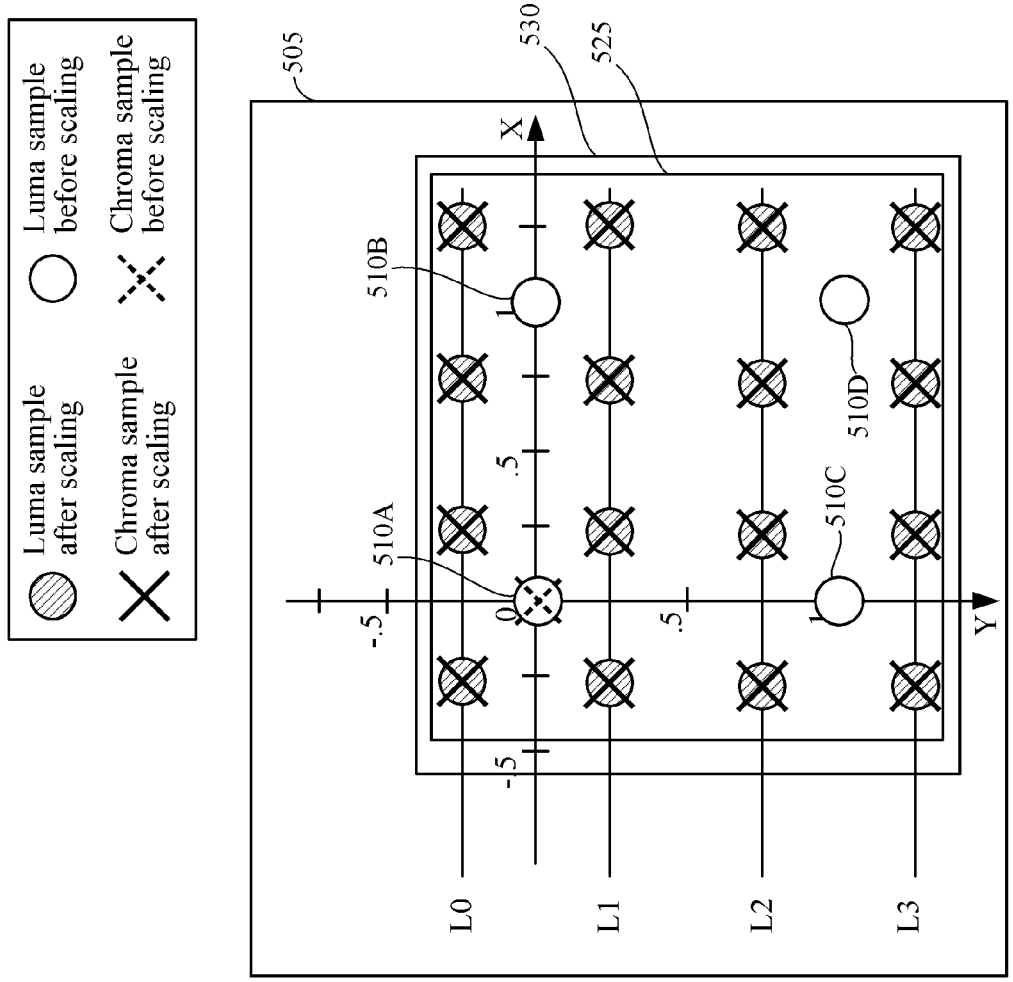
FIG. 5 illustrates an in-phase example of upscaling an image wherein the phase shift between luma and chroma samples of a pixel is zero.

FIG. 5 illustrates one example of upsampled and scaled image data 505 wherein the chroma values are in phase with the luma values. As shown, original pixels 510A-D were processed to be upsampled and scaled. Pixel 510A had both luma and chroma values, while pixels 510B-D only had associated luma values. After processing, an upsampled luma area 525 comprises luma values for 16 pixels that were calculated on the basis of the luma values from the original pixels 510A-D. Note that the luma area 525 is aligned perfectly with an upsampled chroma area 530. Accordingly, because there is no phase shift between the values of the luma and chroma for each pixel, these pixels will more accurately represent the colors and luminance of the original pixels after processing through the general scaler circuit 130.

Those having skill in the art will further appreciate that the various illustrative logical blocks, modules, circuits, and process blocks described in connection with the implementations disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The blocks of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such that the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A non-transitory computer-implemented method in a processor, comprising:

receiving a subsampled input image having luma and chroma samples into the processor;

determining an initial phase difference between the luma and chroma samples from chroma site information of the subsampled input image;

performing a phase computation of the subsampled input image with the processor to determine scaling parameters such that phase differences between all color components of an output image are zero; and concurrently performing, at a general scaler circuit of the processor, upscaling and chroma upsampling on the subsampled input image based on the scaling parameters to generate an upscaled image with no phase difference from the subsampled input image such that the upscaled and upsampled image is not distorted with respect to the subsampled input image.

2. The method of claim 1, wherein the subsampled input image has a different number of luma and chroma samples.

3. The method of claim 1, wherein the subsampled input image is one of 4:2:2 Y'CbCr and 4:2:0 Y'CbCr.

4. The method of claim 1, further comprising determining a width and a height for each chroma and luma sample.

5. The method of claim 4, wherein performing a phase computation of the input image further comprises calculating a scaling ratio based on the luma and chroma width and height of the input image.

6. The method of claim 5, wherein performing a phase computation further comprises the steps of representing a phase difference between luma and chroma samples after the phase computation in terms of an initial phase of luma plane scaling and an initial phase of chroma plane scaling such that the phase difference is zero and calculating the x and y dimension scalings of chroma based on the scaling ratio and x and y dimension initial phase differences.

7. The method of claim 1, wherein the phase computation of the input image is performed prior to a combined upscaling and upsampling process.

8. A device, comprising:
an integrated circuit within a processor configured to receive subsampled images having a first number of luma and chroma samples for each pixel, determine an initial phase difference between the luma and chroma samples from chroma site information of the subsampled input image, perform a phase computation of the subsampled input image with the processor to determine scaling parameters such that phase differences between all color components of an output image are zero, and upsample the received images to output target images having an increased number of chroma samples for each pixel, wherein the integrated circuit further comprises a general scaler module within the processor that concurrently performs at a general scaler circuit of the processor, scaling and chroma upsampling on the subsampled input image based on the scaling parameters to generate an upscaled image with no phase difference from the subsampled input image such that the upscaled and upsampled image is not distorted with respect to the subsampled input image; and
a control module configured to control input of the chroma samples to the scaler such that scaled output images from the scaler luma and chroma samples are in phase.

9. The device of claim 8, wherein the device is part of a multimedia display subsystem (MDSS).

10. A non-transitory, computer readable medium containing processor executable instructions that when executed perform a method comprising:
receiving a subsampled input image having luma and chroma samples into a processor;
determining an initial phase difference between the luma and chroma samples from chroma site information of the subsampled input image;
performing a phase computation of the subsampled input image with the processor to determine scaling parameters such that phase differences between all color components of an output image are zero; and
concurrently performing, at a general scaler circuit of a processor, upscaling and chroma upsampling on the subsampled input image based on the scaling parameters to generate an upscaled image with no phase difference from the subsampled input image such that the upscaled and upsampled image is not distorted with respect to the subsampled input image.

11. The computer readable medium of claim 10, wherein the subsampled input image has a different number of luma and chroma samples for each pixel.

12. The computer readable medium of claim 10, wherein the subsampled input image has a pixel format selected from 4:2:2 Y'CbCr or 4:2:0 Y'CbCr.

13. The computer readable medium of claim 10, further containing processor executable instructions that when executed perform a method of determining a width and a height for groups of chroma and luma samples in the subsampled input image.

14. The computer readable medium of claim 10, further comprising processor executable instructions that when executed perform a method of calculating a scaling ratio based on the luma and chroma width and height of the subsampled input image.

15. The computer readable medium of claim 10, further comprising processor executable instructions that when executed perform a method of representing a phase difference between the luma and chroma samples after the phase computation in terms of an initial phase of luma plane scaling and an initial phase of chroma plane scaling such that the phase difference is zero, and calculating the x and y dimension scalings of chroma based on the scaling ratio and x and y initial phase differences.

16. An electronic device, comprising:
means for receiving a subsampled input image having luma and chroma samples;
means for determining an initial phase difference between the luma and chroma samples from chroma site information of the subsampled input image;
means for performing a phase computation of the subsampled input image to determine scaling parameters such that phase differences between all color components of an output image are zero; and
means for concurrently performing, at a general scaler circuit of the processor, upscaling and chroma upsampling on the subsampled input image based on the scaling parameters to generate an upscaled image with no phase difference from the subsampled input image such that the upscaled and upsampled image is not distorted with respect to the subsampled input image.

17. A processor configured for:
receiving a subsampled input image having a different number of luma and chroma samples into the processor;
determining an initial phase difference between the luma and chroma samples from chroma site information of the subsampled input image;
performing a phase computation of the subsampled input image with the processor to determine scaling parameters such that phase differences between all color components of an output image are zero; and
concurrently performing, at a general scaler circuit of the processor, upscaling and chroma upsampling on the subsampled input image based on the scaling parameters to generate an upscaled image with no phase difference from the subsampled input image such that the upscaled and upsampled image is not distorted with respect to the subsampled input image.

18. The processor of claim 17 configured to perform a method for processing images, wherein the subsampled input image is one of 4:2:2 Y'CbCr and 4:2:0 Y' CbCr.

19. The processor of claim 17 configured to perform a method for processing images, further comprising determining a width and a height for each chroma and luma sample.

20. The processor of claim 19 configured to perform a method for processing images, wherein performing a phase computation of the input image further comprises calculating a scaling ratio based on the luma and chroma width and height of the input image.

* * * * *